United States Patent
Li et al.

(10) Patent No.: US 9,673,998 B2
(45) Date of Patent: Jun. 6, 2017

(54) DIFFERENTIAL CACHE FOR REPRESENTATIONAL STATE TRANSFER (REST) API

(71) Applicant: Futurewei Technologies, Inc., Plano, TX (US)

(72) Inventors: Li Li, Bridgewater, NJ (US); Wu Chou, Basking Ridge, NJ (US); Wei Zhou, Sandy Bay (AU)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 430 days.

(21) Appl. No.: 14/279,001

(22) Filed: May 15, 2014

(65) Prior Publication Data

US 2015/0334043 A1    Nov. 19, 2015

(51) Int. Cl.
*G06F 15/167*  (2006.01)
*H04L 12/64*   (2006.01)
*H04L 12/911*  (2013.01)
*H04L 29/08*   (2006.01)

(52) U.S. Cl.
CPC ........ *H04L 12/6418* (2013.01); *H04L 47/783* (2013.01); *H04L 67/2842* (2013.01); *H04L 67/2852* (2013.01)

(58) Field of Classification Search
CPC ............. G06F 17/30902; G06F 12/123; H04L 67/2842; H04L 67/2852; H04L 69/329
See application file for complete search history.

(56) References Cited

U.S. PATENT DOCUMENTS

| | | | |
|---|---|---|---|
| 2007/0180144 A1* | 8/2007 | Basu | G06F 17/30908 709/246 |
| 2012/0198037 A1* | 8/2012 | Shelby | H04L 41/0213 709/223 |
| 2013/0111325 A1* | 5/2013 | Yue | G06F 17/30902 715/234 |
| 2013/0117400 A1* | 5/2013 | An | H04L 63/0823 709/206 |
| 2013/0179545 A1* | 7/2013 | Bishop | H04L 67/42 709/219 |
| 2015/0007199 A1* | 1/2015 | Valeva | G06F 9/546 719/313 |

* cited by examiner

*Primary Examiner* — Shean Tokuta
(74) *Attorney, Agent, or Firm* — Vierra Magen Marcus LLP

(57) ABSTRACT

System and method of differential cache control. Different parts of a representation are controlled by different cache expiration times. A differential control scheme may adopt a hierarchical control structure in which a subordinate level control policy can override its superordinate level control policies. Different parts of the representation can be updated to a cache separately. Differential cache control can be implemented by programming a cache control directive in HTTP/1.1. Respective cache expiration time and their control scopes can be specified in a response header and/or response document provided by a server.

18 Claims, 14 Drawing Sheets

210

```
HTTP/1.1 200 OK
Content-Type: text/xml
Cache-Control: max-age=1000
Cache-Control: max-age=2000, scope=#net1,#net2
Cache-Control: max-age=4000, scope=#add <ports>
  ...content omitted...
  <link rel="network" xml:id="net1" href="/quantum/v2.0/tenants/t100/networks/net1" />
  <link rel="network" xml:id="net2" href="/quantum/v2.0/tenants/t100/networks/net2" />
  <link rel="add" xml:id="add" href="/quantum/v2.0/tenants/t100/networks/factory" />
</ports>
```

213 — HTTP/1.1 200 OK
201 — Content-Type: text/xml
202 — Cache-Control: max-age=1000
203 — Cache-Control: max-age=2000, scope=#net1,#net2
211
212
217 — ...content omitted... — 214
218 — <link rel="network" xml:id="net1" ...
219 — <link rel="network" xml:id="net2" ...
215
216

```
HTTP/1.1 200 OK
Content-Type: text/xml
Cache-Control: max-age=1000

<ports>
    ...content omitted...
    <link rel="network" cache-control="max-age=2000" href="/quantum/v2.0/tenants/t100/networks/net1" />
    <link rel="network" cache-control="max-age=2000" href="/quantum/v2.0/tenants/t100/networks/net2" />
    <link rel="add" cache-control="max-age=4000" href="/quantum/v2.0/tenants/t100/networks/factory" />
</ports>
```

221 — (points to Cache-Control line)
222 — (points to max-age=2000)
223 — (points to max-age=4000)

FIG. 2B

```
HTTP/1.1 200 OK
Content-Type: Multipart/Related; boundary=part; type=text/xml
Cache-Control: max-age=1000

--part
Content-Type: text/plain
Content-ID: 0

<ports>
  ...content omitted...
<link rel="network"
href="/quantum/v2.0/tenants/t100/networks/net1" />
--part
Content-Type: text/plain
Cache-Control: max-age=2000
Content-ID: 1

<link rel="network"
href="/quantum/v2.0/tenants/t100/networks/net2" />
--part
Content-Type: text/plain
Cache-Control: max-age=4000
Content-ID: 2

<link rel="add" href="/quantum/v2.0/tenants/t100/networks/factory"
/>
--part
Content-Type: text/plain
Content-ID: 3

</ports>
--part
```

FIG. 2D

| Configuration | Avg. No. of Remote Calls |
|---|---|
| Fixed URI | 1.22 |
| No Caching | 3.98 |
| Cache Only | 2.68 |
| Cache and Entity | 1.70 |

FIG. 9

DIFFERENTIAL CACHE FOR REPRESENTATIONAL STATE TRANSFER (REST) API

TECHNICAL FIELD

The present disclosure relates generally to the field of communication network, and, more specifically, to the field of a caching mechanism for a communication network.

BACKGROUND

In a software-defined network (SDN) architecture, the control plane that implements important network routing and switching functionalities and the data forwarding plane are decoupled. This feature differs from the traditional network management protocols, such as Simple Network Management Protocol (SNMP) and more recent Network Configuration Protocol (NETCONF). The control plane in SDN can be logically centralized and implemented with a variety of hardware components of varied architectures. As a result, the data plane in SDN may utilize inexpensive and simplified network switches or routers configurable by an SDN controller. The SDN paradigm has increasingly gained popularity in both research and commercial environments due to its scalability, cost-efficiency, reliability, and flexibility in customizing and optimizing network services to specific user needs.

In a typical SDN architecture, a logically centralized SDN controller is employed to control the behaviors of underlying data forwarding elements (e.g., switches and routers) through some southbound application programming interfaces (APIs). On the other hand, the SDN controller, either implemented in a centralized or distributed manner, also provides an abstraction of the network functions with a programmable interface, called northbound API, for application entities to consume the network services and configure the network dynamically.

Some SDN controllers, e.g., Floodlight, adopt Representational State Transfer (REST) architecture style for northbound APIs (or REST APIs), e.g., used for managing and configuring the SDN network. The Hypertext Transfer Protocol/1.1 (HTTP/1.1) is typically used to implement such an API following REST architectural style.

A REST interface is a communication technique deployed for clients and servers to interact with each other over the Internet. For example, a client initiates a request that is processed by the server and a response is returned from the server to the client. A REST request may includes resource identifiers and actions (such as GET, PUT, POST, and DELETE) to be taken on the resources, To reduce web response latency, network traffic and server load, caches are commonly utilized to store copies of responses that include the requested representations. Then if there is a subsequent request for the same Uniform Resource identifier (URL) for example, the cached response can be retrieved and provided to a client, thereby avoiding requesting and/or accessing the original server for the same representation. Caches can be located at the server side or the client side, or between a server and a client (intermediary cache or proxy cache).

The performance and scalability of a RESTful architecture is largely determined by the effectiveness and efficiency of caches. The current HTTP/1.1 cache control scheme treats a resource representation (e.g., a document) as the smallest unit of caching and thus only allows a uniform cache control policy to be applied on the entire resource representation. However, in the real world, especially in the context of SDN northbound API, different parts or elements of a representation often change their state at different frequencies, as configured by the corresponding application program. If a representation is cached according to the most frequently changed parts, the less frequently changed parts can become unavailable too soon because the entire representation expires at the same time. If the representation is cached according to the least frequently updated parts, cache utilization is inefficient and stale content tends to occur. A middle ground control policy chosen between the two extremes can lead to both caches misses and stale content.

SUMMARY OF THE INVENTION

Therefore, it would be advantageous to provide a cache mechanism for RESTful architecture with improved efficiency and effectiveness.

Embodiments of the present disclosure provide a differential cache control mechanism allowing different parts, or elements, of a representation to be cached according to different control policies with respect to a cache control attribute. The differential control schemes vary in form corresponding to different data structures of a given representation. A differential control scheme may adopt a hierarchical control structure in which a subordinate level control policy overrides its superordinate level control policies. As a result, caching time of different parts of a representation can be tailored to the changing frequencies of individual parts, thereby advantageously improving caching efficiency and reducing cache misses and stale content. The differential cache control mechanism can be implemented by programming the cache control directives in HTTP/1.1. Respective control policies and their control scopes can be specified in a response header and/or response document provided by a server.

For a representation having a hierarchical data structure, a multi-level cache control model can be adopted. In a simplest form, a global control policy is specified for the entire representation. A part control policy can be specified for a particular part of the representation and thus apply to all subparts nested therein, superseding the applicability of the global control policy on the particular part. Further, a subpart control policy can be specified for a particular subpart, superseding the applicability of the global policy and the part control policy on the particular subpart. For an unstructured representation that has sequential parts, a global control policy can be specified as a default, while other control policies can be further specified for selected parts.

In one embodiment of the present disclosure, an apparatus comprises: (1) a transceiver configured to receive a request for a resource representation from a network management application, wherein said resource representation corresponds to a network resource pertaining to network management operations of a software defined network (SDN); and (2) a processor coupled to said transceiver and configured to: (a) assign a first cache expiration time to a first part of said resource representation based on a change rate of said first part; (b) assign a second cache expiration time to a second part of said resource representation based on a change rate of said second part, wherein said first cache expiration time and said second cache expiration time are different, wherein said first cache expiration time defines a duration that said first part remains fresh and said second cache expiration time defines a duration that said second part remains fresh; and (c) generate a response to the network management application, said response comprising: said resource representation and indications that said first cache expiration time is to be applied to said first part of said resource representation, and that said second cache expiration time is to be applied to said second part of said resource representation.

In another embodiment of the present disclosure, a method of providing an Application Programming Interface (API) to applications for managing a software-defined network (SDN) by using a SDN controller comprises: (1) receiving a request from a network management application for accessing a representation that corresponds to a network management resource pertaining to network management operations of SDN, wherein said representation comprises a first part and a second part; (2) assigning a first cache expiration time to said first part based on a change rate of said first part at said SDN controller; (3) assigning a second cache expiration time to said second part based on a change rate of said second part at said SDN controller, said second cache expiration time being different from said first cache expiration time; (4) generating a response to said network management application, said response comprising said representation, and indications that said first cache expiration time is associated with said first part, and that said second cache expiration time is associated with said second part.

In another embodiment of the present disclosure, a method of accessing a resource representation to manage a software defined network (SDN) via Representational State Transfer (REST) Application Programming Interface (API), said method comprising: (1) sending a first request by a network management application to a SDN controller for accessing a representation that corresponds to a network management resource pertaining to network management operations of said SDN; and (2) receiving a first response from said SDN controller, wherein said first response comprises a first part and a second part of said representation, and indications that a first cache expiration time is assigned with said first part, and that a second cache expiration time is assigned with said second part, wherein said first cache expiration time defines a duration that said first part remains fresh and said second cache expiration time defines a duration that said second part remains fresh, and wherein said second cache expiration time is different from said first cache expiration time.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which:

FIG. 2A shows an exemplary HTTP response message designating different cache expiration times to different parts of a representation in the response header in accordance with an embodiment of the present disclosure.

FIG. 2B is an exemplary HTTP response message designating different cache expiration times to different parts of a representation using XML extension mechanism in accordance with an embodiment of the present disclosure.

FIG. 2D shows an exemplary HTTP response message designating different cache expiration times to different parts of a MIME representation in accordance with an embodiment of the present disclosure.

FIG. 9 is a table that compares the average number of remote calls tom complete an operation resulted from the four experimental configurations.

DETAILED DESCRIPTION

Figure 1:
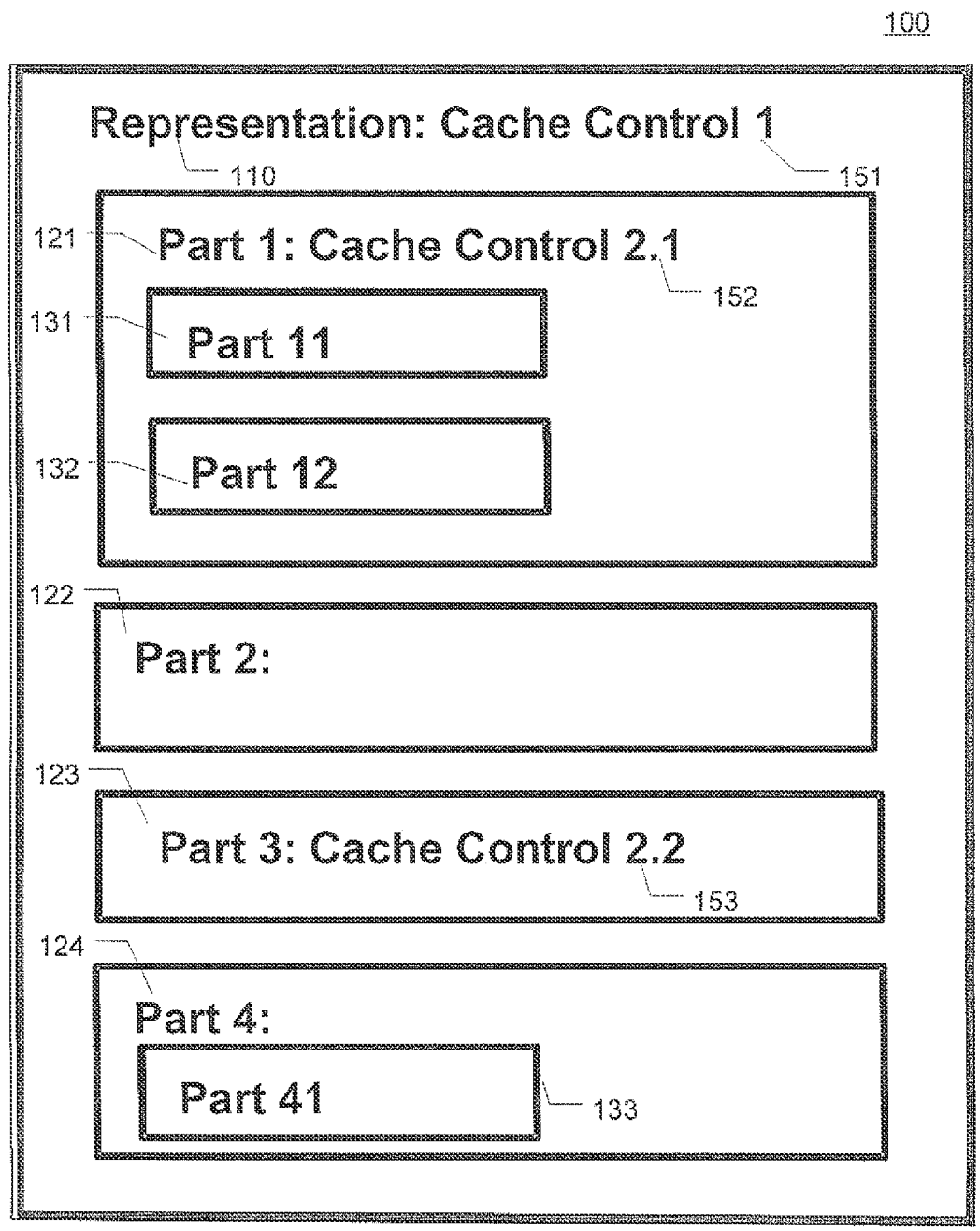
FIG. 1 is a diagram illustrating an exemplary differential cache control scheme configured for a representation including multiple content parts arranged in a hierarchy structure in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Differential Cache for Representational State Transfer (REST) API

Embodiments of the present disclosure employ a differential cache scheme with respect to a caching control attribute to control caching of a resource representation. The different parts of the representation can be cached according to different cache control policies in the scheme. Depending on the document structures of the representations, the differential cache models vary in form. For example, a top level control policy applies to the entire representation by default. A particular part, or element, of the representation adopts the control policy assigned to its closest superordinate level part, unless a different control policy is explicitly assigned to the particular part. The control policies may be related to any attribute of cache control policy, e.g., cache expiration time that defines a period that the cached data is considered to be fresh. A cache expiration time for a particular part may be determined based on a state change rate of the particular part.

Generally, a "resource" refers to a service, system, device, directory, data store, group of users, or a combination thereof. Representational state Transfer (REST) uses a resource identifier to identify a particular resource involved in an interaction between components. The resource identifier may be an Interne Protocol (IP) Address in the form of a Uniform Resource Locator (URL) link or Uniform Resource Identifier (URI).

REST components perform actions on a resource by using a representation to capture the current or intended state of the resource and transferring the representation between the components. In general, a representation is a sequence of bytes, plus representation metadata to describe those bytes. A representation may refer to a document, a file, an HTTP message entity, instance, or variant in various contexts. A representation includes data, metadata describing the data, and on occasion, metadata to describe the metadata.

According to the present disclosure, with respect to a representation comprising parts arranged a hierarchical structure, the cache control model may includes a hierarchy of control policies. A control policy specified for a part is applied to all its subordinate parts except for those that are assigned with a separate control policy. With respect to a representation divided into a sequence of consecutive blocks of bytes, the cache control model may have two levels: block-level control policies applied to selected blocks; and a global policy applied to the remaining blocks.

FIG. 1 is a diagram illustrating an exemplary differential cache control scheme 100 configured for a representation 110 including multiple content parts arranged in a hierarchy structure. The representation 110 had two levels of parts. The first level of parts includes part 1 (121), part 2 (122), part 3 (123), and part 4 (124); and the second level of parts includes parts 11 (131) and 12 (132) nested in part 1 (121), and part 41 (133) nested in part 4 (124).

The cache control scheme 100 configured for the representation 110 includes two levels: a top level policy 151 (cache control 1); and a second level policies 152 and 153 (cache control 2.1 and 2.2).

The top level policy 151, or the global policy, is by default applicable globally to the entire representation except for the individual parts assigned with other policies specifically. As shown in the diagram, cache control 2.1 (152) is specifically assigned to part 1 (121) and thus takes precedence over cache control 1 (151) and governs the caching behavior with respect to part 1 (121) and its subparts, e.g., part 11 (131) and part 12 (132). In other words, the upper level cache control 151 (cache control 1) is superseded by the lower-level cache control 152 (cache control 2.1) with respect to part 1 (121) and its subparts (131 and 132). By the same token, cache control 2.2 (153), rather than cache control 2.1 (152), is applied to part 3 (123). In effect, part 1(121) including parts 11 and 12 (131 and 132) are to be cached according to cache control 2.1 (152), and part 3 (123) is to be cached according to cache control 2.2 (153).

On the other hand, there is no lower-level cache control specified for part 2 (122) and part 4 (124) and its subpart. So part 2 (122), part 4 (124) including part 41 (133) are to be cached according to the closest upper level control which is the global policy 151 (cache control 1) in this example.

Although this example demonstrates a two-level cache control hierarchy structure, the present disclosure is not limited to any numbers of cache control levels that can be used for a given representation.

According to the present disclosure, differential cache control enables caching control policies to be tailored to different behaviors of individual components of a representation. Particularly, different components of a representation that have varying state changing rates can be updated to a cache separately. Thereby, communication traffic caused by repetitively retrieving the same content of the representation from a resource can be advantageously reduced. Thus, the caching efficiency can be improved with reduced cache misses and stale content. Moreover, network and I/O bandwidth requirements can be significantly reduced, and scalability and responsiveness can be increased.

A representation can be cached in any type of cache memories, such as caches located on the server side, browser caches located on the client side, proxy caches located on a proxy server, and gateway caches. The cache control policies according to the present disclosure can be related to any attribute that controls caching behavior of a cache, such as expiration time, cacheability, validation, and so on. Pertinent to HTTP, and more specifically, to HTTP/1.1, the cache control policies may be defined in terms of the directives of max-age, s-maxage, public, private, no-cache, no-store, must-revalidate, proxy-revalidate, and so on.

The term "representation" herein may correspond to document, HTML page, file, image, HTTP message entity, instance, or variant. The present disclosure is not limited to any media type or representation format to which a differential cache control model can be applied. A representation may be of a structured or unstructured media type that is well known in the art, such as XML, text/HTML, JSON, MIME MultiPart, image, video, or a binary file.

It will be appreciated that the present disclosure is not limited to any particular communication protocol in which a representation as well as the associated cache control policies is distributed through the network. The differential cache control mechanism can be used in the conjunction with HTTP/1.0, HTTP/1.1, IMAP, IRC, LDAP, MGCP, NNTP, BGP, NTP, and etc. In particular, a RESTful API adopting differential cache control that is implemented in HTTP/1.1 standard is readily compatible with existing devices and systems that do or do not support differential cache. For purposes of illustration, embodiments described herein uses response messages in HTTP/1.1 to transfer the representations and designate cache control policies thereto.

In the context of SDN controller northbound APIs, REST APIs may include software components that provide network services, such as grouping virtual machines into isolated virtual networks and assigning IP addresses to them. In some embodiments, the network services can be performed by managing three types of entities: virtual network to which virtual machines attach by ports, IP address block (subnet), and port that receives IP addresses when it joins the subnets. A resource representation may include an initial URI of a REST API as an entry URI for a client to access the REST API. The URI contained in the initial representation identifies the resources for accessing each of the three entities of the network service program. After accessing the entry URI, a client can then obtain the hyperlinks to access the three types of entities. The operations on these types of entities may include list, search, read, create, update and delete. In addition, a network entity has two additional hyperlinks for accessing its belonging subnet and port entities.

FIG. 2A shows an exemplary HTTP response message 210 designating different cache expiration times to different parts of a representation in the response header 211 in accordance with an embodiment of the present disclosure. The response message 210 is generated by a SDN controller in response to a client request message (e.g., generated by a network management application program in the application layer of the SDN) for accessing a resource representation that includes the identified scopes "net1," "net2," and "add."

The response message 210 includes a header portion 211 and a representation content portion 212. As defined in the header 211 of the response message 210 by the directive "content type" 213, the media type of the representation content is text/XML. In general, the XML is a structured document type, and each element thereof can be represented with an XML identification. A similar cache control configuration can be applied to any other structured media type, such as text/HTML and application/JSON.

The HTTP/1.1 cache control extension mechanism is used here to identify the scope ("net1", "net2" and "add") of differential cache control in the header 211, such that cache controls are visible to intermediate caches, e.g., proxy caches, as well as receiving clients.

Here a commonly-used HTTP cache-control directive max-age is used to indicate the expiration time for caching a named part of the representation. In the header 211, a global expiration time of 1000 seconds (1000 s) is defined for the entire representation (max-age=1000 as in 201) as a default. A max-age of 2000 s (as in 202) is defined for "net1" and "net2" (scope=#net1, #net2), and a max-age 4000 s is defined for "add" (as in 203). The value of a scope includes one or more of XML identifications (e.g., "net1" and "net2" as in 202) uniquely identifying the corresponding elements of the XML document.

The requested representation is included in the content portion 212 of this sample message 210. Here the representation encompasses three named parts (or elements) 217, 218 and 219, each part having a hyperlink for "net1" "net2", and "add." Each hyperlink, including the scope identification and the action hyperlink to be operated thereon, correspond to network service or management operations on an associated scope (e.g., "net1" and "net2" as in 202). The "xml:id" identify the associated scopes net1 ("xml:id=net1" as in 214), net2 ("xml:id=net2" as in 215) and add ("xml:id=add" as in 216).

The HTTP message in FIG. 2A may be generated by a server operable to configure the differential cache model based on the knowledge of how various parts of the representation behave, e.g., their respective state changing frequencies. For exempla, in an SDN northbound API, hyperlinks in a representation denote the services provided by the resources, and are usually stable. Whereas, other parts of the representation represents states which change frequently. Accordingly, the SDN controller can attach different cache control policies to the different parts.

The requesting client device receives the response message, including the representation (the returned hyperlinks) and the cache control model with respect to the cache expiration times, and caches the different parts in a local cache memory based on the cache control model. When the requesting client device needs to access the hyperlinks to perform the network configuration or management operations on the identified scopes, the client device just needs to retrieve cached hyperlinks within respective cache expiation times thereof from a local cache memory, which can save the client from extra rounds of remote calls.

FIG. 2B is an exemplary HTTP response message 220 designating different cache expiration times to different parts of a representation using XML extension mechanism in accordance with an embodiment of the present disclosure. As for a client device receiving this representation, this HTTP response message defines the same cache expiration time policies to the same parts as in the message 210 of FIG. 2A. The entire representation is to be cached for 1000 s (max-age=1000 as defined in 221) by default. The parts pertaining to scopes "net1" and "net2" are to be cached for 2000 s (as defined in 222), and the part pertaining to the scope "add" is to be cached for 4000 s (as defined in 223).

However, as they are embedded as XML attributes 222 and 223 in this example, the part-level policies are only visible to clients and invisible to intermediate caches. Thus, by executing the directive of max-age in the header 221

(max-age=1000) only, an intermediate cache uniformly caches the entire representation for 1000 s based on the information in the header, including the parts pertaining to the scopes "net1," "net2" and "add" and despite the designations in the content portion of the message 220. The intermediate cache may be a proxy server cache for instance. A similar cache control configuration can be applied to any other structured media type, such as text/HTML and application/JSON.

A proxy cache server coupled between the SDN server and a client device may receive the response message, including the representation (the returned hyperlinks) and the cache control model regarding the cache expiration times, and cache the different parts in the representation in the proxy cache based on the cache control model. When the requesting client device needs to access the hyperlinks to perform the network configuration or management operations, the client device just needs to retrieve cached hyperlinks within respective cache expiration times thereof from the proxy memory, which can save the client from extra rounds of remote calls directed to the SDN controller.

Figure 2C:
FIG. 2C shows an exemplary HTTP request message and response message through which specific parts of the representation can be updated in the cache in accordance with an embodiment of the present disclosure.

Because different parts of a representation can be cached for different times, the different part can be updated individually. FIG. 2C shows an exemplary HTTP request message 230 and response message 240 through which specific parts of the representation can be updated in the cache in accordance with an embodiment of the present disclosure.

The request message 230 includes a "Get" request 231 for retrieving the updated representation parts (the hyperlinks) pertaining to "net1" and "net2," rather than to the entire representation, from the server. The server returns the response message 240 including the updated content of the two requested parts. In this example, also included in the response message 240 are the new expiration times attached to selected parts. Thus, the new global cache time becomes 2000 s as defined in 241, and the new cache time for the part pertaining to "net1" becomes 3000 s as defined in 242.

An updating event of representation parts can be prompted by various other events. For example, during a cache revalidation process, a cache updating request message may be generated automatically based on an application program and transmitted from a client device periodically or when the cache time for "net1" and "net2" expires.

The differential cache control mechanism according to the present disclosure can also be applied to a resource representation having unstructured content, like a MIME, or unknown structure. In a response message, individual parts can be identified by their part identifications or content identifications and associated with respective cache control policies.

FIG. 2D shows an exemplary HTTP response message 250 designating different cache expiration times to different parts of a MIME representation in accordance with an embodiment of the present disclosure. The MIME representation is divided into consecutive blocks of byes according to RFC 1521 and RFC2387 for example. Each part, or block of bytes, is associated with a content ID, namely 0, 1, 2, and 3, as labeled in 251-254 respectively. In addition to the global cache expiration time 255 (max-age=1000 s) defined in the header, a cache expiration time is embedded in each part of the representation content, e.g., in 256 and 257.

Figure 2E:
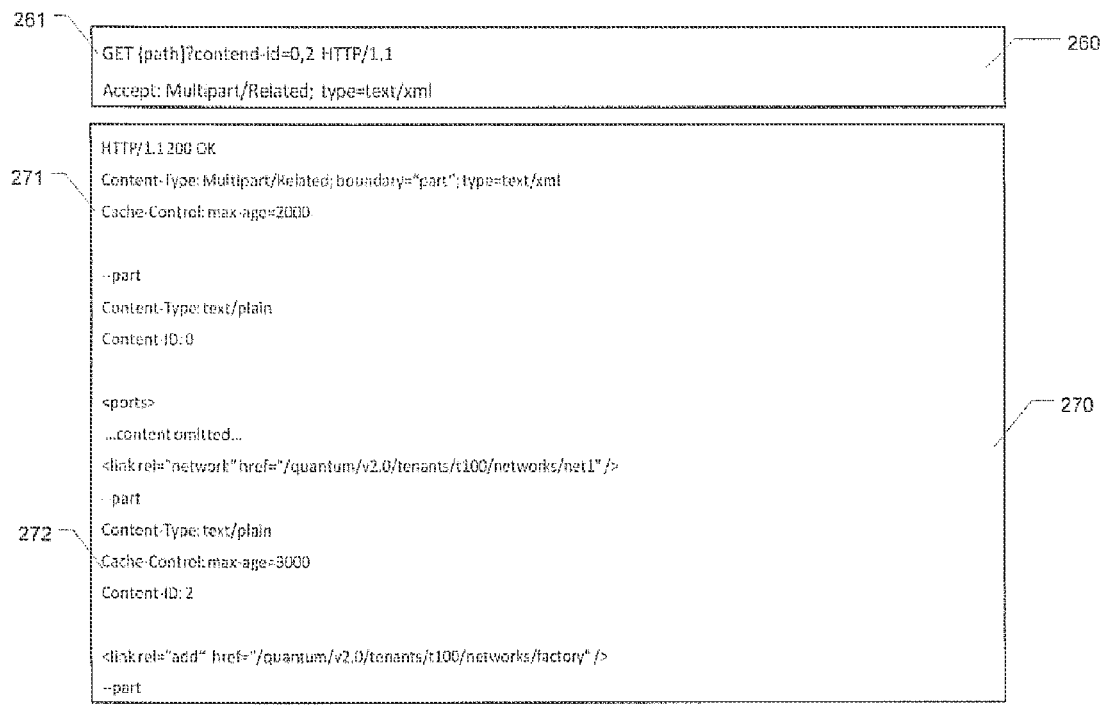
FIG. 2E shows an exemplary HTTP request message and response message through which specific parts of the MIME representation in FIG. 2D can be updated to a cache memory in accordance with an embodiment of the present disclosure.

FIG. 2E shows an exemplary HTTP request message 260 and response message 270 through which specific parts of the MIME representation in FIG. 2D can be updated to a cache memory in accordance with an embodiment of the present disclosure. The request message in FIG. 2E includes a "Get" request 260 for updating parts "0" and "2" by the "content-id" from the parts, rather than the entire representation, The SDN controller server returns a response message including the updated content of the two requested parts, which are the updated hyperlinks of the two parts. In this example, also included in the response message time are new global policy 271 (max-age=2000) and a new policy attached to part "2" 272 (max-age=3000). Thus, the new global cache time becomes 2000 s and the new cache time for part "2" becomes 3000 s.

Figure 3A:
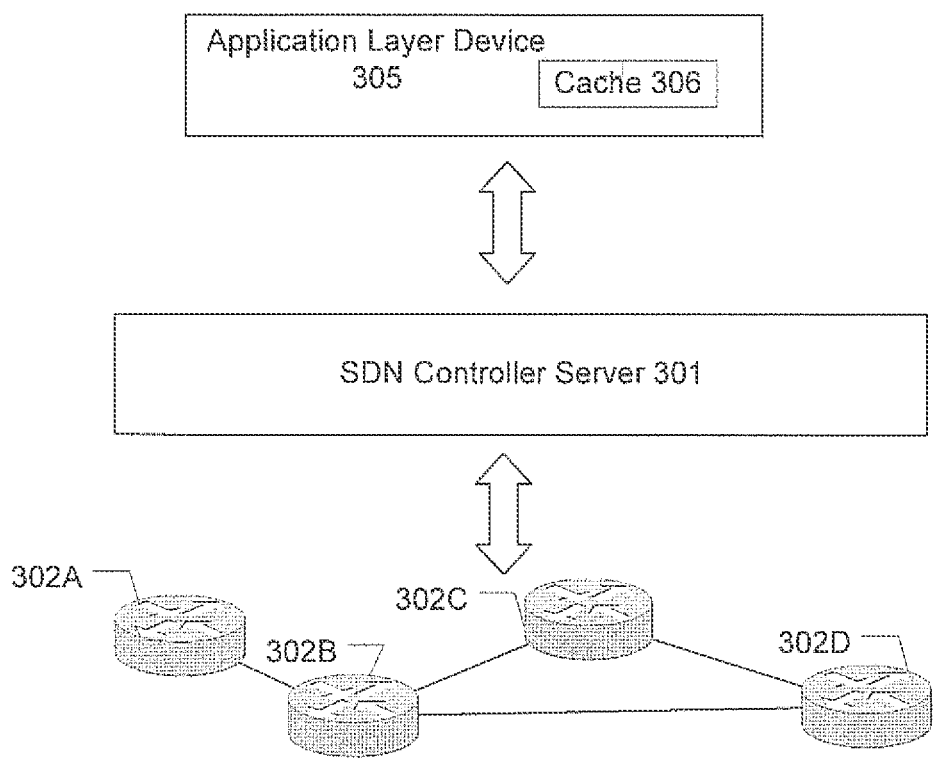
FIG. 3A illustrates an exemplary SDN system wherein an application layer device can access a northbound REST API resource through hyperlink representations that are cached based on a differential cache model and in a local cache memory according to an embodiment of the present disclosure.

The returned representation may be cache memory may be managed by the requesting client application program or a proxy. FIG. 3A illustrates an exemplary SDN system 300 wherein an application layer device 305 can access a northbound REST API resource through hyperlink representations that are cached based on a differential cache model in a local cache memory 306 according to an embodiment of the present disclosure. The local cache memory is managed by the SDN application layer device 305.

In the illustrated example, the logically centralized SDN controller server 301 is employed to control the behaviors of underlying data forwarding elements (e.g., switches and routers) 302A-302D through some southbound APIs via the OpenFlow protocol. On the other hand, the SDN controller server 301, also provides an abstraction of the network functions with the northbound API for application programs, e.g., implemented in device 305, to consume the network services and configure the network dynamically.

A request message (e.g., 230 in FIG. 2C) can be generated in device 305 and sent to the SDN controller server 301 for accessing a representation of a resource, e.g. for operations on network components 302A-302D. The SDN controller server 301 returns hyperlinks along with the associated cache expiration times as a representation in a response message (e.g., 240 in FIG. 2C). The returned representation is cached in the cache memory 306 based on a differential cache model, such that the application device 305 can retrieve the hyperlinks in the representation from its local memory 306 in the future, rather than from the remote SDN controller server 301. When a cache expiration time defined in the representation expires, an updated state of the corresponding part (e.g., a hyperlink) can be provided from the SDN controller server 301, e.g., in response to an update request message sent from the application layer device 305.

Figure 3B:
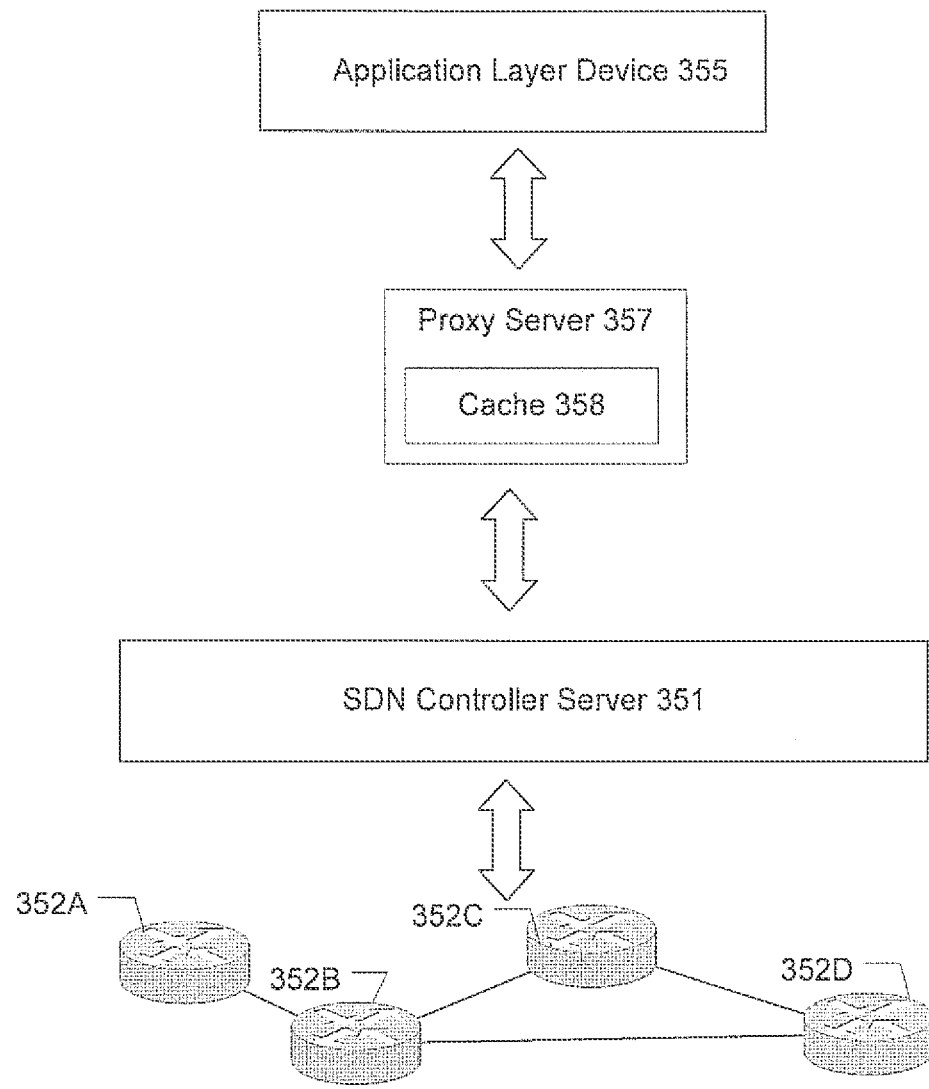
FIG. 3B illustrates an exemplary SDN system wherein the application layer device 355 can access a northbound REST API resource through hyperlink representations that are cached based on a differential cache model and in a proxy cache memory according to an embodiment of the present disclosure.

FIG. 3B illustrates an exemplary SDN system 350 wherein the application layer device 355 can access a northbound REST API resource through hyperlink representations that are cached based on a differential cache model and in a proxy cache memory 358 according to an embodiment of the present disclosure. The proxy cache memory 308 is managed by a proxy server 357 coupled to the application layer device 355 and the SDN controller server 351.

The SDN controller server 351 is employed to control the behaviors of underlying data forwarding elements (e.g., switches and routers) 352A-352D through some southbound APIs 353 via the OpenFlow protocol. On the other hand, the SDN controller server 351 also provides an abstraction of the network functions with the northbound API for application programs, e.g., implemented in device 355, to consume the network services and configure the network dynamically.

A request message (e.g., 230 in FIG. 2C) can be generated in device 355 and sent to the SDN controller server 351 for accessing a representation of a resource, e.g. to perform operations on network components 352A-352D. The SDN controller server 351 returns hyperlinks along with the associated cache expiration times as a representation in a response message (e.g., 240 in FIG. 2C). The returned representation is cached in the proxy cache memory 358 based on a differential cache model, such that the application device 355 can retrieve the pertinent hyperlinks from the proxy memory 358 in the future, rather than from the remote SDN controller 351. When a cache expiration time defined in the representation expires, an updated state of the corresponding part (or hyperlink) can be provided from the SDN controller 351, e.g., in response to an update request message sent from the application device 355.

Figure 4:
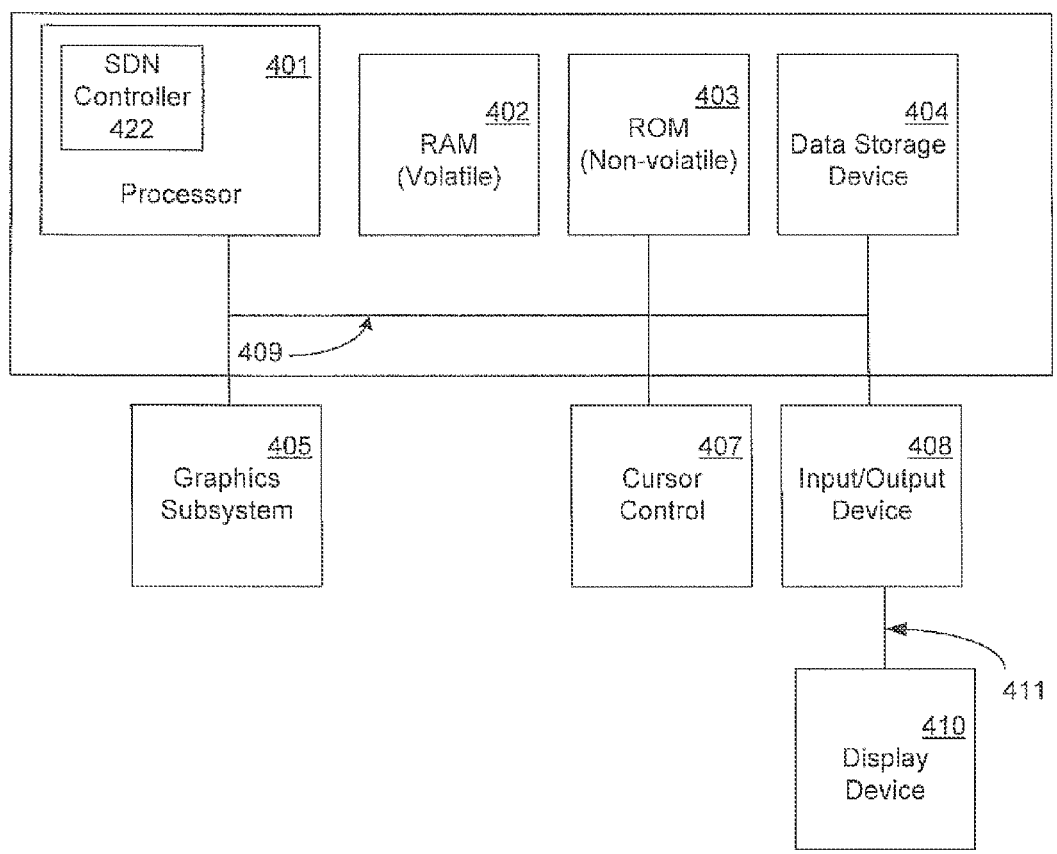
FIG. 4 illustrates an exemplary configuration of a SDN controller device capable of providing a representation of northbound REST API and assign a differential cache control model to the representation in according to an embodiment of the present disclosure.

FIG. 4 illustrates an exemplary configuration of a SDN controller device 400 capable of providing a representation of northbound REST API and assign a differential cache control model to the representation in according to an embodiment of the present disclosure. The exemplary system 400 upon which embodiments of the present disclosure may be implemented includes a general purpose computing system environment. In its most basic configuration, computing system 400 typically includes at least one processing unit 401 and memory storing instructions to implement a differential cache control method, and an address/data bus 409 (or other interface) for communicating information. Depending on the exact configuration and type of computing system environment, memory may be volatile (such as RAM 402), non-volatile (such as ROM 403, flash memory, etc.) or some combination of the two.

The processor 401 may comprise an SDN controller component 422 configured to perform functions described herein. Alternatively, the processor may be operable to execute an SDN controller program stored in a storage media of the system 400 and configured to perform functions described herein.

Computer system 400 may also comprise an optional graphics subsystem 405 for presenting information to the computer user, e.g., by displaying information on an attached display device 410, connected by a video cable 411. According to embodiments of the present disclosure, the graphics subsystem 405 may be coupled directly to the display device 410 through the video cable 411. In alternative embodiments, display device 410 may be integrated into the computing system (e.g., a laptop or netbook display panel) and will not require a video cable 411.

Additionally, computing system 400 may also have additional features and functionality. For example, computing system 400 may also include additional storage media (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Signal communication interface (input/output device) 408, also coupled to bus 409, can be a serial port. Communication interface 408 may also include wireless communication mechanisms. Using communication interface 408, computer system 400 can be communicatively coupled to other computer systems over a communication network such as the Internet or an intranet (e.g., a local area network), or can receive data (e.g., a digital television signal).

Figure 5:
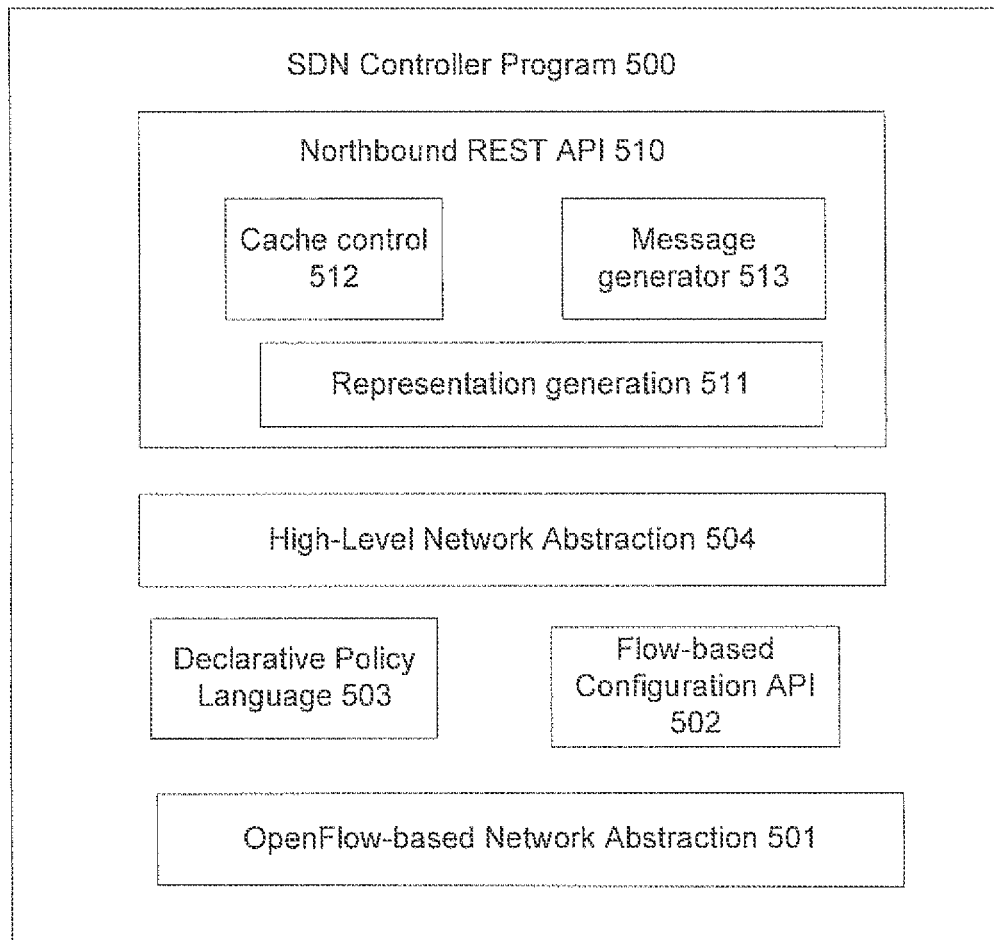
FIG. 5 illustrates an exemplary internal architecture of an OpenFlow SDN controller capable of providing a representation of northbound REST API and assign a differential cache control model to the representation in according to an embodiment of the present disclosure

FIG. 5 illustrates an exemplary internal architecture of an OpenFlow SDN controller 500 capable of providing a representation of northbound REST API and assign a differential cache control model to the representation in according to an embodiment of the present disclosure. The SDN controller 500 comprises the OpenFlow-based network abstraction 501 for applications to manage the network in an efficient and flexible manner. It maintains a global topology of OpenFlow network and provides a configuration API to manage the flow tables in the underlying OpenFlow devices. Based on this configuration, built-in applications can implement high-level network abstractions 504, such as virtual networks, that provide an efficient way to mange modern networks, such as for the large scale data networks in data centers and cloud computing platforms.

The OpenFlow controller 500 may provide the flow-based network configuration API 502 in both Python and C++. Applications can add/remove flow entries as well as handling events, such as packet-in, from the OpenFlow devices. The declaratory policy languages 503, e.g., Flow-based Management Language (FML), may expose network programmability by expressing the semantics of network policies declaratively rather than actually implementing them through the southbound API.

The northbound REST API 510 provides an API for managing network components of a SDN. According to the present disclosure, the REST API can be treated as a set of type representations connected by transitions. Each transition specifies the possible interactions with the resource referenced by a hyperlink in a representation. The REST API 510 comprises a representation generation module 511, a cache control module 512, and a message generator module 513. The representation generation module 511 is configured to generate or update a representation in response to a request for accessing or updating a representation in whole or in part. The cache control module 512 is configured to determine cache expiration times for the various parts of a representation based on their state change rates. The message generator module 513 can generate a response message containing the representation and the associated cache expiration times, e.g., in compliance with HTTP.

In general, clients accessing a hypertext-driven REST API can start from visiting the entry URI and then follow the returned hyperlinks to access other resources. This provides the REST API with desired flexibility and extensibility including the loosely-coupled and late binding features. However, comparing to the fixed-URI scenario where clients access the resources through fixed URIs directly, now clients may need to take a few rounds of remote calls before accessing the required resource. For complex applications where the number of rounds is large, this could introduce performance costs.

Particularly, in the case of accessing a hypertext-driven representation in REST API, many calls are solely for retrieving the hyperlinks rather than the application state. These hyperlinks are changed much less frequently comparing to the other representation elements such as attributes.

Therefore, caching these hyperlinks with other elements in the same cache entry and/or by the same cache control policy would cause unnecessary cache invalidations and reloads from the server. Therefore, the hyperlinks that are changed much less frequently can be cached separately from other application-state-dependant elements in the representation such as attributes. So a transit request which accesses hyperlinks only can still retrieve the valid hyperlinks from the cache, even when the corresponding container representation has been invalidated because of the changes on its contained attributes.

In some embodiments, a hyperlink cache can be configured to store representations indexed by Uniform Resource Identifiers (URIs). The stored representations contain the hyperlinks which typically change less frequently than the resource state. Therefore, this cache can provide more stable navigation paths for clients to reach the required resources. Selection of hyperlinks to be cached and the assigned cache time are application-specific.

In some embodiments, hyperlinks can be classified into two categories: entity hyperlinks and action hyperlinks. An entity hyperlink acts as an entry for accessing a specific entity, while an action hyperlink is for executing a specific operation on one or a group of entities. Accordingly, in some embodiments, a representation accessible through a hypertext-driven REST API can be divided into three parts, including the hyperlink part, the entity index part and the remaining part. Based on a differential cache control scheme in accordance with an embodiment of the present disclosure, each part can be specified with a separate cache control policy with respect to a certain attribute, e.g., max-age. Further, the hyperlink part and the entity index part can be cached in different caches with respective cache policies.

The presence of the action hyperlinks in the container representation are defined at design time. In contrast, the presence of entity hyperlinks depends on the runtime application state. For example, a "create" action hyperlink can be designed to be always present in the representation. In contrast, after adding or deleting a network, the corresponding network entity hyperlink should also be added or removed from the representation.

Figure 6:
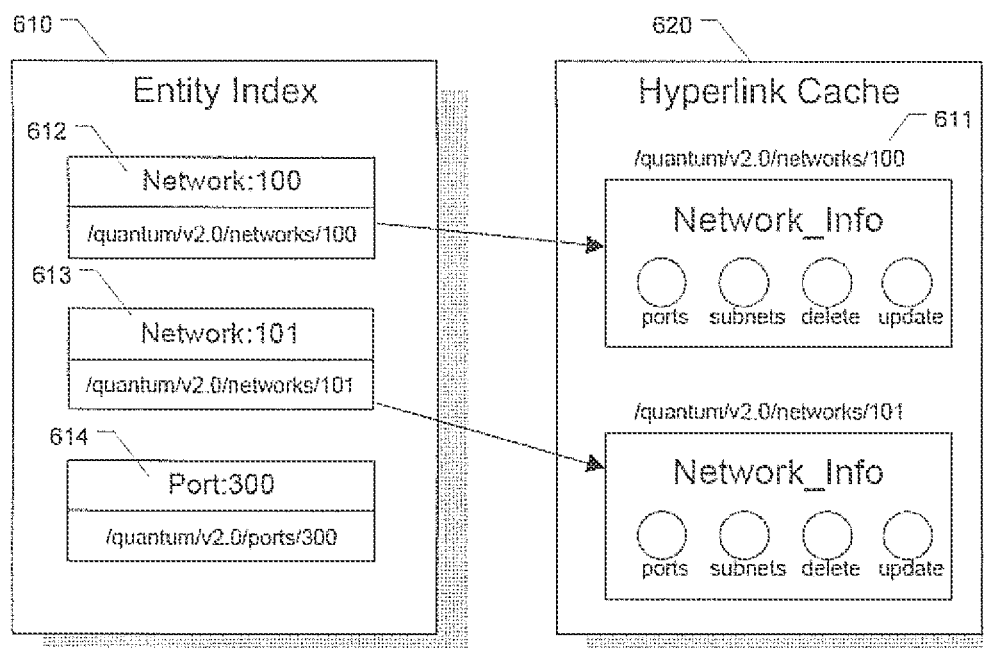
FIG. 6 illustrates a combination of entity index cache and the hyperlink cache to which a differential cache model can be applied in accordance with an embodiment of the present disclosure.

Therefore, to provide a stable navigation path through hyperlinks, a hyperlink cache can be dedicated to store the action hyperlinks only, such that the cache receives invalidations only from updates on the API implementation, but not from updates on the application state. FIG. 6 illustrates a combination of entity index cache 610 and the hyperlink cache 620 to which a differential cache model can be applied in accordance with an embodiment of the present disclosure. As shown, the entity index includes a lookup table used to retrieve action hyperlinks in the hyperlink cache 620. For example, the network hyperlink 611 is an entity hyperlink for accessing a specific network entity, Network:100. The other types of hyperlinks are all action hyperlinks Therefore, the attributes and the entity hyperlinks are excluded from the hyperlink cache 620, but can be aggregated into an index for mapping entity IDs to URIs.

For example, to facilitate the cache to identify the action hyperlink, a hyperlink can be assigned with an ID attribute to differentiate the entity hyperlinks from the action hyperlinks. The entity hyperlinks include the entity ID in this attribute, while the action hyperlinks simply do not have this attribute.

It has been observed that clients often tend to access a specific entity by its ID attribute, as the core application logic of the client are typically implemented based on its internal data model, rather than based on the resource model and the URI namespace of the REST API to which it relies on. For example, users may input the network ID into the command line tools for managing a specific virtual network. The network ID needs be translated into the REST resource URI to access the network entity in the network controller.

The entity hyperlinks, which are not cached in the hyperlink cache 620, contain mapping relationship between an entity and its corresponding resource URI, as shown in 610.

The entity hyperlinks are aggregated them into a global index, namely the "entity index" 610. The index key of each entity hyperlink can be the combination of its "rel" and "id" attributes, while the value is the "href" attribute. The "rel" attribute specifies the type of entities. The entity index then allows clients to query multiple types of entities from one single index.

The entity index 610 acts like bookmarks that offer clients shortcuts to access the REST API, rather than always start from the entry URI. Used it together with the hyperlink cache 620, clients can perform operations on the entity with much less remote calls. Then entity index 610 consists of a network table containing three entries 612-614, which are extracted from the formerly returned representations. A user may issue a request to update the network by its ID, e.g., "100". In response, the entity index 610 is looked up for a matching URI, which can be performed by a plug-in application in the server device. In the best scenario, an entry matching this URI already exists in the hyperlink cache. In this case, the client can obtain the required action hyperlink locally and update the network entity without any extra remote call.

The entity index 610 can also use the cache-control directive max-age, contained in the "cache" attribute, to manage the expiration of index entries. Upon receiving a new entity hyperlink which matches an existing entry, the expiration time of this entry can be updated accordingly, as described in greater detail above.

In some embodiments, multiple representations may contain entity hyperlinks mapping to the same entity. Aggregating them into a single entry in the entity index removes duplication and saves cache spaces. Explicit invalidation for the entity index is simple and efficient. Whereas for the hyperlink cache, explicit invalidation implies scanning through representations for any matched entity hyperlink, as representations may contain duplicated entity hyperlinks. With the entity index 610, clients can obtain the required URI through one single lookup. In contrast, with a single hyperlink cache, it needs to search starting from the cached entry URI until retrieving the required hyperlink.

Figure 7:
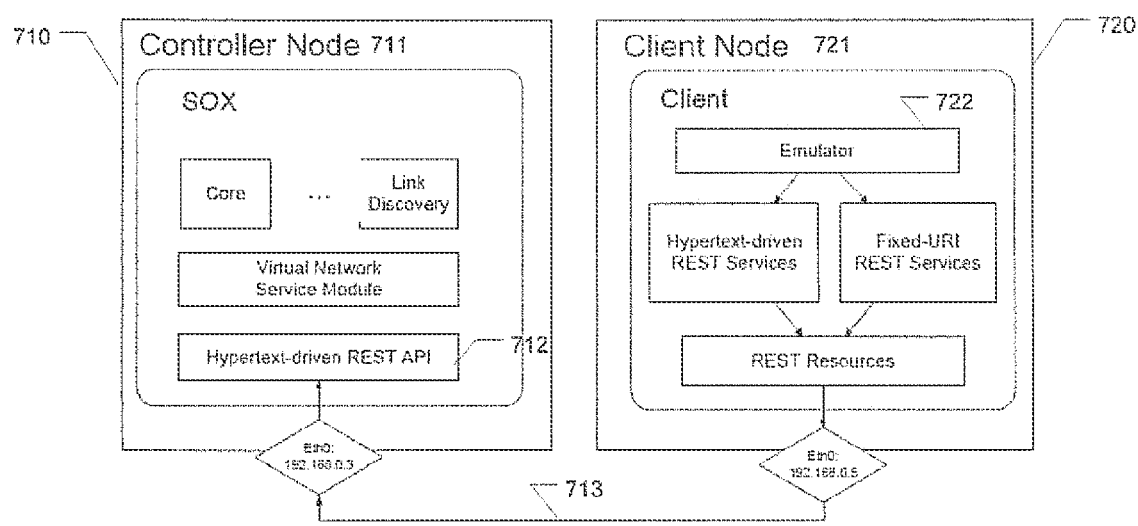
FIG. 7 illustrates an exemplary experimental setup for evaluating client-side hyperlink caching in accordance with an embodiment of the present disclosure.

FIG. 7 illustrates an exemplary experimental setup for evaluating client-side hyperlink caching in accordance with an embodiment of the present disclosure. The system includes two physical machines configured as a controller node 711 and a client node 721 respectively. The two machines 710 and 720 are connected by a Gigabit LAN 713. The emulator client 722 resides in machine 720, while a SOX SDN controller 711 exposing the northbound REST API 712 resided in the other physical machine 710. They were connected by a single private switch. This setup prevented interferences from external traffics. The Round-Trip Time (RTT) between the two machines is consistently less than 0.2 ms.

The evaluation was conducted in multiple rounds. In each round, the system performance was evaluated under a specific configuration. In the beginning of each round, the emulator 722 started the warm-up process to add 100 initial networks, to simulate a medium-sized tenant scenario. The process of updating a network contains 10 operations of adding, updating or deleting a port or subnet entity on average. While the processes of creating, viewing and deleting a network involves all the belonging ports and subnets.

After the warm-up process, the emulator 722 continuously executed a random process of creating, viewing, updating, or deleting a network, until the round ends. Each round lasted for about one hour. The Effectiveness of Caching was evaluated in the following four configurations.

In the "fixed-URI" configuration, clients accessed resources directly by URIs.

In the "no cache" configuration, the hypertext-driven approach is applied to allow accessing the REST API without any caches. Therefore, each operation starts by accessing the entry URI and taking all the required rounds of remote calls to access the target resource.

In the "cache only" configuration, only the returned action hyperlinks are cached. The entity index caching entity hyperlinks is disabled.

In the "cache and index" configuration, both the hyperlink cache and entity index to cache are used to cache all hyperlinks.

Figure 8:
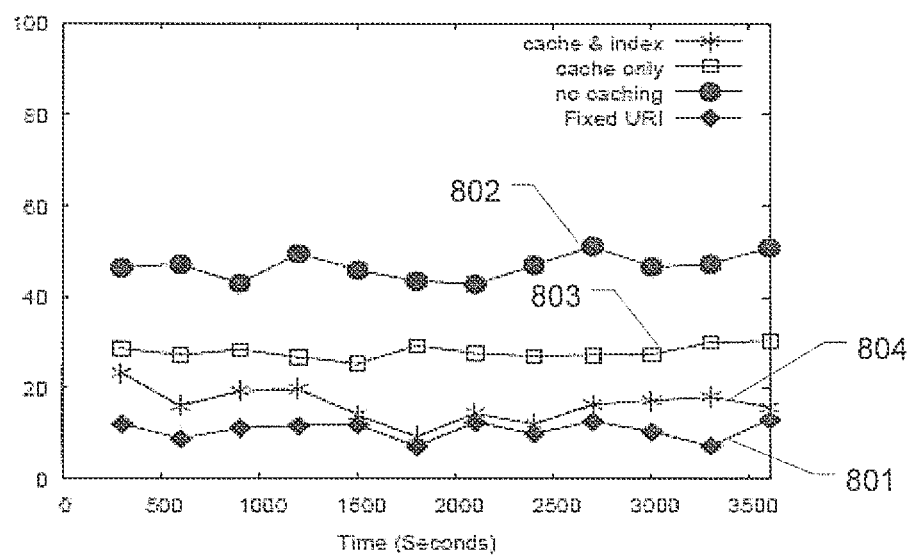
FIG. 8 is a data plot showing cache performance evaluation results of the above four scenarios.

In this evaluation experiment, the differential cache control mechanism is applied in the "Cache only" and "Cache and index" configuration. FIG. 8 is a data plot showing cache performance evaluation results of the above four scenarios. The "fixed URI" configuration (data shown in 801) naturally achieves the best performance, with an overall average response time of 10.35 ms. In contrast, the "no caching" (data shown in 802) performs the worst with an overall average response time of 46.82 ms. Therefore, in this case, the hypertext-driven approach (data shown in 803) incurred the costs of about 4.52 times longer response time. When using both the hyperlink cache and entity index to optimize performance (data shown in 8044), the "cache and index" configuration achieves the average response time of 15.80 ms, which is only one third of the "no caching" configuration. It shows that our caching techniques can effectively improve the performance of clients in accessing hypertext-driven REST API. On the other hand, comparing to the best case of "fixed URI," the "cache and index" configuration increases the response time by about 50%. The "cache only" configuration disables the entity index and achieves 27.92 ms, which increases the response time of the "cache and index" configuration by about 76%.

FIG. 9 is a table that compares the average number of remote calls to complete an operation resulted from the four experimental configurations. The "cache and entity" saved about half of the remote calls comparing to "no caching". This largely matches the response time difference of the two configurations, which further proves the effectiveness of embodiments of the present disclosure. A form-based approach was also applied to create and update entities for the fixed-URI configuration, and therefore, its average number of remote calls is also larger than 1. In this perspective, the "cache and index" increases the number of remote calls from the "fixed URI" by about 40%.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. An apparatus comprising:
a transceiver configured to receive a request for a resource representation from a network management application, wherein said resource representation corresponds to a network resource pertaining to network management operations of a software defined network (SDN); and
a processor coupled to said transceiver and configured to:
assign a first cache expiration time to a first part of said resource representation based on a change rate of said first part;
assign a second cache expiration time to a second part of said resource representation based on a change rate of said second part, wherein said first cache expiration time and said second cache expiration time are different, wherein said first cache expiration time defines a duration that said first part remains fresh and said second cache expiration time defines a duration that said second part remains fresh; and
generate a response to the network management application, said response comprising: said resource representation and indications that said first cache expiration time is to be applied to said first part of said resource representation, and that said second cache expiration time is to be applied to said second part of said resource representation,
send said response to an intermediate cache server accessible to said application, wherein said first cache expiration time is specified in a header, said second cache expiration time is specified in a content body and invisible to said intermediate cache server, and said first part and said second part are cached in said intermediate cache server in accordance with said first cache expiration time,
wherein said first cache expiration time in the header of the response is visible to said intermediate cache server and said second cache expiration time in the content body of the response is invisible to said intermediate cache server, and
wherein said resource representation comprises a plurality of parts arranged in a hierarchical structure, wherein a subpart is nested in said first part and said resource representation comprises consecutive blocks of bytes, wherein said first part and said second part correspond to two respective blocks of bytes.

2. The apparatus of claim 1, wherein said processor is coupled to a proxy server that manages a cache memory, wherein said resource representation is cached in said cache memory based on said response, and where said resource representation is accessed by said network management application from said cache memory.

3. The apparatus of claim 1, wherein said processor is further configured to assign a third cache expiration time to said subpart in said response based on a change rate of said subpart, wherein said subpart is cached in a cache memory according to said third expiration time, wherein said first part less said subpart is cached in said cache memory according to said first expiration time, and wherein said cache memory is controlled by said network management application.

4. The apparatus of claim 3,
wherein said transceiver is further configured to receive an update request from said application entity for accessing an update of said subpart;
wherein said processor is further configured to:
assign a fourth cache expiration time to said subpart; and
generate an update response comprising: said update of said subpart, and an indication that said fourth cache expiration time is to be applied to said subpart regardless of said third expiration time; and
wherein said transceiver is configured to send said update response to said network management application.

5. The apparatus of claim 3, wherein said resource representation has a media type of Extensible Markup Language (XML), wherein said plurality of parts correspond to EML elements, and wherein each XML element is associated with a respective XML identification.

6. The apparatus of claim 1, wherein said resource representation has a media type of MIME multipart.

7. A method of providing an Application Programming Interface (API) to applications for managing a software-defined network (SDN) by using a SDN controller, said method comprising:
receiving a request from a network management application for accessing a representation that corresponds to a network management resource pertaining to network management operations of SDN, wherein said representation comprises a first part and a second part;
assigning a first cache expiration time to said first part based on a change rate of said first part at said SDN controller;
assigning a second cache expiration time to said second part based on a change rate of said second part at said SDN controller, said second cache expiration time being different from said first cache expiration time;
generating a response to said network management application, said response comprising said representation, and indications that said first cache expiration time is associated with said first part, and that said second cache expiration time is associated with said second part, wherein said response comprises a header and a content body; and
sending said response to an intermediate cache server accessible to said application, wherein said first cache expiration time is specified in said header, said second cache expiration time is specified in said content body and invisible to said intermediate cache server, and said first part and said second part are cached in said intermediate cache server in accordance with said first cache expiration time, and
wherein the representation corresponds to a structured representation comprising a hierarchy of parts, wherein said second part is nested in said first part in said hierarchy, and said representation comprises consecutive blocks of bytes, wherein said first part and said second part correspond to two respective blocks of bytes.

8. The method of claim 7, wherein said network management application is configured to: cache said first part less said second part in accordance with said first cache expiration time; and cache said second part in accordance with said second cache expiration time.

9. The method of claim 7, wherein network management application is configured to: cache said first part in accordance with said first cache expiration time, and cache said second part in accordance with said second cache expiration time.

10. The method of claim 7, wherein said response is formatted in compliance with Hypertext Transfer Protocol Version 1.1 (HTTP/1.1).

11. The method of claim 7, further comprising:
receiving an update request from said network management application for accessing an update of said second part;
generating an update response comprising: said update of said second part; and indication that a third cache expiration time to be applied to said second part; and
sending said update response to said network management application.

12. The method of claim 7, wherein said first part comprises a plurality of action hyperlinks directing to network configuration operations on a plurality of network entities of said SDN, and wherein said second part comprises an index comprising a Uniform Resource Identifiers (URIs) lookup table for said plurality of network entities.

13. A method of accessing a resource representation to manage a software defined network (SDN) via Representational State Transfer (REST) Application Programming Interface (API), said method comprising:
sending a first request by a network management application to a SDN controller for accessing a representation that corresponds to a network management resource pertaining to network management operations of said SDN; and
receiving a first response from said SDN controller, wherein said first response comprises a first part and a second part of said representation, and indications that a first cache expiration time is assigned with said first part, and that a second cache expiration time is assigned with said second part, wherein said first cache expiration time defines a duration that said first part remains fresh and said second cache expiration time defines a duration that said second part remains fresh, and wherein said second cache expiration time is different from said first cache expiration time,
wherein said first response is received by a proxy server coupled to said network management application, wherein said first response further comprises indications that said first expiration time is visible to said proxy server, and that said second expiration time is invisible to said proxy server, wherein said first part and said second part are cached according to said first cache expiration time at a cache memory in said proxy server, wherein said method further comprises accessing said representation from said cache memory, and
wherein said representation corresponds to a structured representation comprising a hierarchy of parts, and wherein said second part if nested in said first part and said representation comprises consecutive blocks of bytes, wherein said first part and said second part respectively correspond to two blocks of bytes.

14. The method of claim 13, wherein said first response is receive by said network management application implemented on a client device, and wherein said second part if nested in said first part, wherein said method further comprises:
caching said first part except for said second part according to said first expiration time at a cache memory controlled by said network management application; and
caching said second part according to said second expiration time at said cache memory.

15. The method of claim 13, wherein said first response is received by said network management application on a client device, wherein said method further comprises:
caching said first part according to said first expiration time at a first cache memory controlled by said network management application; and
caching said second part according to said second expiration time at a second cache memory controlled by said network management application.

16. The method of claim 15 further comprising:
sending a second request by said network management application to said SDN controller for accessing an update of said second part;
receiving a second response from said SDN controller, wherein said second response comprises: an update of said second part, and indications that a third cache expiration time is assigned to said update of said second part; and caching said update of said second part according to said third cache expiration time.

17. The method of claim 13, wherein said first part comprises a plurality of action hyperlinks, and wherein said second part comprises and entity index, said entity index comprising lookup table configured to map relationship between entities to corresponding resource Uniform Resource Identifiers (URIs).

18. The method of claim 13, wherein said first request and said first response are formatted in compliance with Hypertext Transfer Protocol Version 1.1 (HTTP/1.1).

* * * * *